(12) United States Patent
Ibelings

(10) Patent No.: US 10,531,151 B2
(45) Date of Patent: Jan. 7, 2020

(54) BIDIRECTIONAL AMPLIFIER OR NODE SUPPORTING OUT-OF-BAND SIGNALING

(71) Applicant: Cisco Technology, Inc., San Jose, CA (US)

(72) Inventor: Pieter Gerard Ibelings, Brookhaven, GA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/046,196

(22) Filed: Jul. 26, 2018

(65) Prior Publication Data

US 2018/0332345 A1 Nov. 15, 2018

Related U.S. Application Data

(62) Division of application No. 15/212,336, filed on Jul. 18, 2016, now Pat. No. 10,051,321.

(51) Int. Cl.

| | |
|---|---|
| *H04N 7/16* | (2011.01) |
| *H04N 21/442* | (2011.01) |
| *H04B 10/2507* | (2013.01) |
| *H04B 10/299* | (2013.01) |
| *H04N 21/435* | (2011.01) |
| *H04N 21/462* | (2011.01) |
| *H04N 21/60* | (2011.01) |
| *H04B 10/2575* | (2013.01) |
| *H04N 21/61* | (2011.01) |

(52) U.S. Cl.
CPC ... *H04N 21/44209* (2013.01); *H04B 10/2507* (2013.01); *H04B 10/25751* (2013.01); *H04B 10/299* (2013.01); *H04N 21/435* (2013.01); *H04N 21/44227* (2013.01); *H04N 21/462* (2013.01); *H04N 21/60* (2013.01); *H04N 21/6118* (2013.01); *H04N 21/6168* (2013.01)

(58) Field of Classification Search
CPC .................. H04N 21/44209; H04N 21/44227
See application file for complete search history.

(56) References Cited

U.S. PATENT DOCUMENTS 8,286,209 B2 * 10/2012 Egan, Jr. ................ H04N 7/104
725/127
9,209,898 B1 * 12/2015 Schemmann ...... H04B 10/2503
(Continued)

*Primary Examiner* — Gigi L Dubasky
(74) *Attorney, Agent, or Firm* — Merchant & Gould P.C.

(57) ABSTRACT

An apparatus comprising a bidirectional amplifier or node supporting out-of-band signaling may be provided. The apparatus may comprise a first diplexer, a second diplexer, an upstream reverse amplifier, and a downstream Out-of-Band (OOB) amplifier. The first diplexer may comprise a first diplexer band-stop filter and a first diplexer band-pass filter. The first diplexer band-stop filter may be connected between a first diplexer first port and a first diplexer second port. The first diplexer band-pass filter may be connected between the first diplexer first port and a first diplexer third port. The second diplexer may comprise a second diplexer band-stop filter and a second diplexer band-pass filter. The second diplexer band-stop filter may be connected between a second diplexer first port and a second diplexer second port. The second diplexer band-pass filter may be connected between the second diplexer first port and a second diplexer third port.

19 Claims, 5 Drawing Sheets

(56) References Cited

U.S. PATENT DOCUMENTS

| | | | | |
|---|---|---|---|---|
| 2004/0131357 A1* | 7/2004 | Farmer | ............... | H04J 14/0282 |
| | | | | 398/67 |
| 2004/0264683 A1* | 12/2004 | Bye | ....................... | H04M 7/006 |
| | | | | 379/402 |
| 2005/0034167 A1* | 2/2005 | Weinstein | ............... | H04N 7/104 |
| | | | | 725/129 |
| 2009/0327384 A1* | 12/2009 | Petrovic | ................. | H04B 1/036 |
| | | | | 708/300 |
| 2012/0159556 A1* | 6/2012 | Alkan | ................... | H04N 21/436 |
| | | | | 725/80 |
| 2013/0125182 A1* | 5/2013 | Bowler | ................. | H04H 60/43 |
| | | | | 725/105 |

\* cited by examiner

BIDIRECTIONAL AMPLIFIER OR NODE SUPPORTING OUT-OF-BAND SIGNALING

CROSS-REFERENCE TO RELATED APPLICATIONS

This application is a divisional of and claims priority to U.S. patent application Ser. No. 15/212,336, filed Jul. 18, 2016, the disclosure of which is hereby incorporated herein by reference in its entirety.

TECHNICAL FIELD

The present disclosure relates generally to downstream signaling.

BACKGROUND

Cable television is a system of delivering television programming to paying subscribers via radio frequency (RF) signals transmitted through coaxial cables or light pulses through fiber-optic cables. This contrasts with broadcast television, in which the television signal is transmitted over the air by radio waves and received by a television antenna attached to the television. FM radio programming, high-speed Internet, telephone service, and similar non-television services may also be provided through these cables.

In the most common system, multiple television channels are distributed to subscriber residences through a coaxial cable, which comes from a trunkline supported on utility poles originating at the cable company's local distribution facility, called the headend. Many channels can be transmitted through one coaxial cable by a technique called frequency division multiplexing. At the headend, each television channel is translated to a different frequency. By giving each channel a different frequency "slot" on the cable, the separate television signals do not interfere. At the subscriber's residence, either the subscriber's television or a set-top box (e.g. provided by the cable company) translates the desired channel back to its original frequency (i.e. baseband) and it is displayed on-screen.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
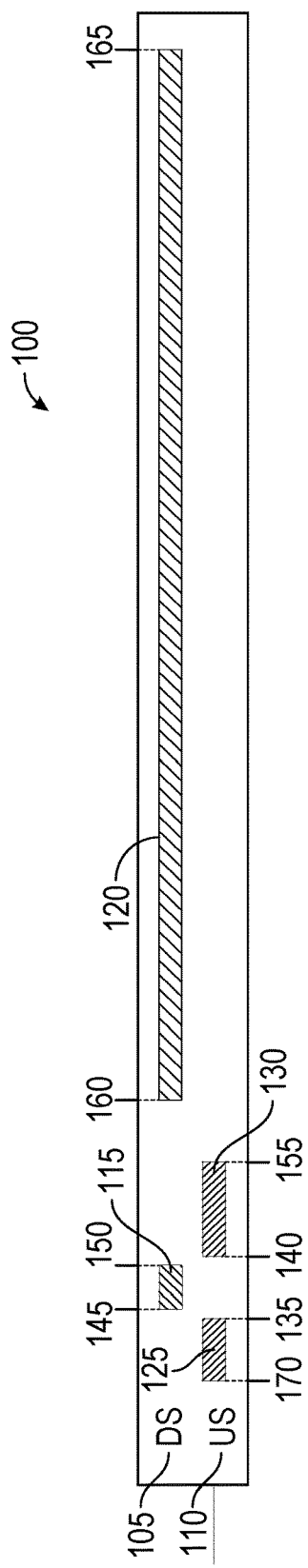
FIG. 1 is a block diagram of a frequency plan.

An apparatus comprising a bidirectional amplifier or node supporting out-of-band signaling may be provided. The apparatus may comprise a first diplexer, a second diplexer, an upstream reverse amplifier, and a downstream Out-of-Band (OOB) amplifier. The first diplexer may comprise a first diplexer band-stop filter and a first diplexer band-pass filter. The first diplexer band-stop filter may be connected between a first diplexer first port and a first diplexer second port. The first diplexer band-pass filter may be connected between the first diplexer first port and a first diplexer third port. The second diplexer may comprise a second diplexer band-stop filter and a second diplexer band-pass filter. The second diplexer band-stop filter may be connected between a second diplexer first port and a second diplexer second port. The second diplexer band-pass filter may be connected between the second diplexer first port and a second diplexer third port. The upstream reverse amplifier may amplify signals from the first diplexer second port to the second diplexer second port. The downstream OOB amplifier may amplify signals from the second diplexer third port to the first diplexer third port.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may provide a bidirectional device (e.g. amplifier or node) comprising a filtering topology that may support out-of-band signaling. This filtering topology may create an out-of-band segment that may be used to pass out-of-band signals used in set-top boxes. The out-of-band segment may be created by adding a second set of band-pass/band-stop filters to conventional reverse amplifier modules as described below consistent with embodiments of the disclosure. Embodiments of the disclosure may not require modifications to conventional forward amplifier modules. Conventional reverse amplifier modules may be modified, consistent with embodiments of the disclosure, to add additional functionality to pass the aforementioned out-of-band signals. Extending the upstream bandwidth in this manner may provide a substantial increase in upstream data throughput while still supporting, for example, millions of set-top boxes currently deployed.

FIG. 1 is a block diagram of a frequency plan 100 in accordance with embodiments of the disclosure. As shown in FIG. 1, frequency plan 100 may comprise a downstream frequency band 105 and an upstream frequency band 110. Downstream frequency band 105 and upstream frequency band 110 may increase in frequency from left to right in FIG. 1. Downstream frequency band 105 may comprise a first downstream frequency band portion 115 (i.e. out-of-band segment) and a second downstream frequency band portion 120. Upstream frequency band 110 may comprise a first upstream frequency band portion 125 and a second upstream frequency band portion 130. First upstream frequency band portion 125 may have an upper limit of a first frequency 135 and second upstream frequency band portion 130 may have a lower limit of a second frequency 140.

First downstream frequency band portion 115 may reside in the frequency spectrum between first upstream frequency band portion 125 and second upstream frequency band portion 130. First downstream frequency band portion 115 may have a lower limit of a third frequency 145 and an upper limit of a fourth frequency 150. Second upstream frequency band portion 130 may have an upper limit of a fifth frequency 155. Second downstream frequency band portion 120 may have a lower limit of a sixth frequency 160 and an upper limit of a seventh frequency 165. First upstream frequency band portion 125 may have a lower limit of an eighth frequency 170.

Consistent with embodiments of the disclosure, first frequency 135 may be less than third frequency 145, fourth frequency 150, second frequency 140, fifth frequency 155, and sixth frequency 160. Third frequency 145 may be greater than first frequency 135, but less than fourth frequency 150, second frequency 140, fifth frequency 155, and sixth frequency 160. Fourth frequency 150 may be greater than first frequency 135 and third frequency 145, but less than second frequency 140, fifth frequency 155, and sixth frequency 160. Second frequency 140 may be greater than first frequency 135, third frequency 145, and fourth frequency 150, but less than fifth frequency 155 and sixth frequency 160. Fifth frequency 155 may be greater than first frequency 135, third frequency 145, fourth frequency 150, and second frequency 140, but less than sixth frequency 160. And sixth frequency 160 may be greater than first frequency 135, third frequency 145, fourth frequency 150, second frequency 140, and fifth frequency 155.

Consistent with embodiments of the disclosure, first frequency 135 may comprise 60 MHz, second frequency 140 may comprise 140 MHz, third frequency 145 may comprise 70 MHz, fourth frequency 150 may comprise 130 MHz, fifth frequency 155 may comprise 204 MHz, and sixth frequency 160 may comprise 258 MHz. Furthermore, consistent with embodiments of the disclosure, the first frequency may comprise 64 MHz, second frequency 140 may comprise 84 MHz, third frequency 145 may comprise 72 MHz, fourth frequency 150 may comprise 76 MHz, fifth frequency 155 may comprise 204 MHz, and sixth frequency 160 may comprise 258 MHz.

Figure 2:
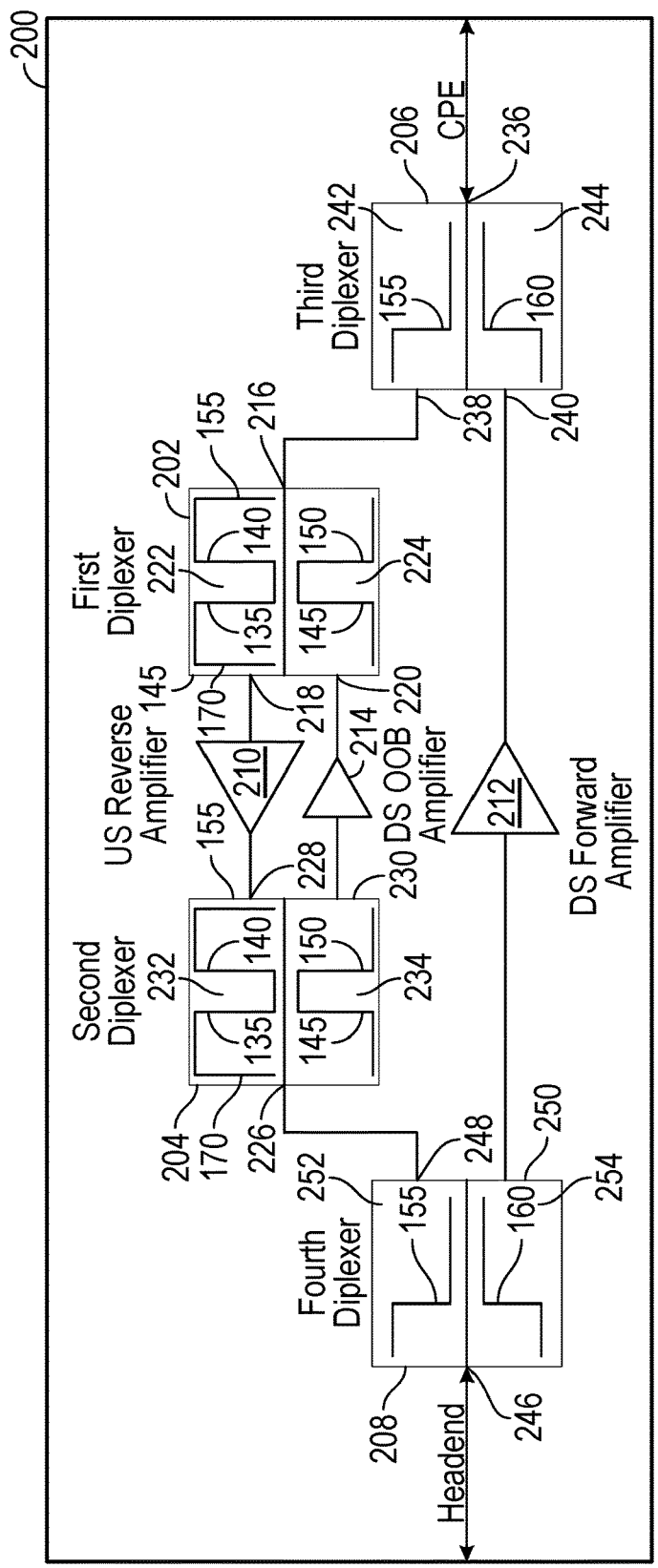
FIG. 2 is a block diagram of an apparatus comprising an amplifier.

FIG. 2 is a block diagram of an amplifier 200. As shown in FIG. 2, amplifier 200 may comprise a first diplexer 202, a second diplexer 204, a third diplexer 206, a fourth diplexer 208, an upstream reverse amplifier 210, a downstream forward amplifier 212, and a downstream Out-of-Band (OOB) amplifier 214. First diplexer 202 may comprise a first diplexer first port 216, a first diplexer second port 218, a first diplexer third port 220, a first diplexer band-stop filter 222, and a first diplexer band-pass filter 224. Second diplexer 204 may comprise a second diplexer first port 226, a second diplexer second port 228, a second diplexer third port 230, a second diplexer band-stop filter 232, and a second diplexer band-pass filter 234. Third diplexer 206 may comprise a third diplexer first port 236, a third diplexer second port 238, a third diplexer third port 240, a third diplexer low-pass filter 242, and a third diplexer high-pass filter 244. Fourth diplexer 208 may comprise a fourth diplexer first port 246, a fourth diplexer second port 248, a fourth diplexer third port 250, a fourth diplexer low-pass filter 252, and a fourth diplexer high-pass filter 254.

A diplexer may comprise a passive device that may implement frequency-domain multiplexing. Two ports (e.g. the second port and the third port) may be multiplexed onto another port (e.g. the first port). The signals on the second port and the third port may occupy disjoint frequency bands. Consequently, the signals on the second port and the third port may coexist on the first port without interfering with each other.

First diplexer band-stop filter 222 may attenuate signals with frequencies between greater than and equal to first frequency 135 and less than and equal to second frequency 140. First diplexer band-stop filter 222 may be connected between first diplexer first port 216 and first diplexer second port 218. First diplexer band-pass filter 224 may pass signals with frequencies between greater than and equal to third frequency 145 and less than and equal to fourth frequency 150. First diplexer band-pass filter may be connected between first diplexer first port 216 and first diplexer third port 220.

Second diplexer band-stop filter 232 may attenuate signals with frequencies between greater than and equal to first frequency 135 and less than and equal to second frequency 140. Second diplexer band-stop filter 232 may be connected between second diplexer first port 226 and second diplexer second port 228. Second diplexer band-pass filter 234 may pass signals with frequencies between greater than and equal to third frequency 145 and less than and equal to fourth frequency 150. Second diplexer band-pass filter 234 may be connected between second diplexer first port 226 and second diplexer third port 230.

Upstream reverse amplifier 210 may amplify signals from first diplexer second port 218 to second diplexer second port 228. Upstream reverse amplifier 210 may be connected between first diplexer second port 218 and second diplexer second port 228. Downstream Out-of-Band (OOB) amplifier 214 may amplify signals from second diplexer third port 230 to first diplexer third port 220. Downstream OOB amplifier 214 may be connected between second diplexer third port 230 and first diplexer third port 220.

Third diplexer low-pass filter 242 may pass signals with frequencies equal to and lower than fifth frequency 155. Third diplexer low-pass filter 242 may be connected between third diplexer first port 236 and third diplexer second port 238. Third diplexer high-pass filter may 244 may pass signals with frequencies equal to and greater than sixth frequency 160. Third diplexer high-pass filter 244 may be connected between third diplexer first port 236 and third diplexer third port 240. First diplexer first port 216 may be connected to third diplexer second port 238. Third diplexer first port 236 may be connected to customer premises equipment (CPE), for example, through a coaxial cable.

CPE may comprise, for example, any terminal and associated equipment located at a subscriber's premises and connected with a carrier's telecommunication channel at a demarcation point. The demarcation point may be established in a building or complex to separate customer equipment from the equipment located in either the distribution infrastructure or central office of the communications service provider. CPE may comprise, but is not limited to, devices such as telephones, televisions, routers, switches, residential gateways (RG), set-top boxes, fixed mobile convergence products, home networking adapters and Internet access gateways that may enable consumers to access communications service providers' services and distribute them around their house via a local area network (LAN) for example.

Fourth diplexer low-pass filter 252 may pass signals with frequencies equal to and lower than fifth frequency 155. Fourth diplexer low-pass filter 252 may be connected between fourth diplexer first port 246 and fourth diplexer second port 248. Fourth diplexer high-pass filter 254 may pass signals with frequencies equal to and greater than sixth frequency 160. Fourth diplexer high-pass filter 254 may be connected between fourth diplexer first port 246 and the fourth diplexer third port 250. Second diplexer first port 226 may be connected to fourth diplexer second port 248. Fourth diplexer first port 246 may be connected to a headend, for example, through a coaxial cable. Downstream forward amplifier 212 may amplify signals from fourth diplexer third port 250 to third diplexer third port 240. Downstream forward amplifier 212 may be connected between fourth diplexer third port 250 and third diplexer third port 240.

The headend may comprise, but is not limited to, a master facility for receiving television signals for processing and distribution over, for example, a cable television system. The headend may be unstaffed and may be surrounded by some type of security fencing and may be a building or large shed housing electronic equipment used to receive and re-transmit video over a local cable infrastructure.

The headend may transmit downstream signals into fourth diplexer first port 246. The combination of fourth diplexer high-pass filter 254, downstream forward amplifier 212, and third diplexer high-pass filter 244 may insure that signals equal to and above sixth frequency 160 (e.g. in second downstream frequency band portion 120) may be transmitted downstream through amplifier 200 from the headend to the CPE. The combination of fourth diplexer low-pass filter 252, second diplexer band-pass filter 234, downstream OOB amplifier 214, first diplexer band-pass filter 224, and third diplexer low-pass filter 242, may insure that signals between third frequency 145 and fourth frequency 150 inclusively (e.g. in first downstream frequency band portion 115) may be transmitted downstream through amplifier 200 from the headend to the CPE.

Similarly CPE may transmit upstream signals into third diplexer first port 236. The combination of third diplexer low-pass filter 242, first diplexer band-stop filter 222, upstream reverse amplifier 210, second diplexer band-stop filter 232, and fourth diplexer low-pass filter 252 may insure that signals between eighth frequency 170 and first frequency 135 inclusively (e.g. in first upstream frequency band portion 125) and signals between second frequency 140 and fifth frequency 155 inclusively (e.g. in second upstream frequency band portion 130) may be transmitted upstream through amplifier 200 from the CPE to the headend.

Figure 3:
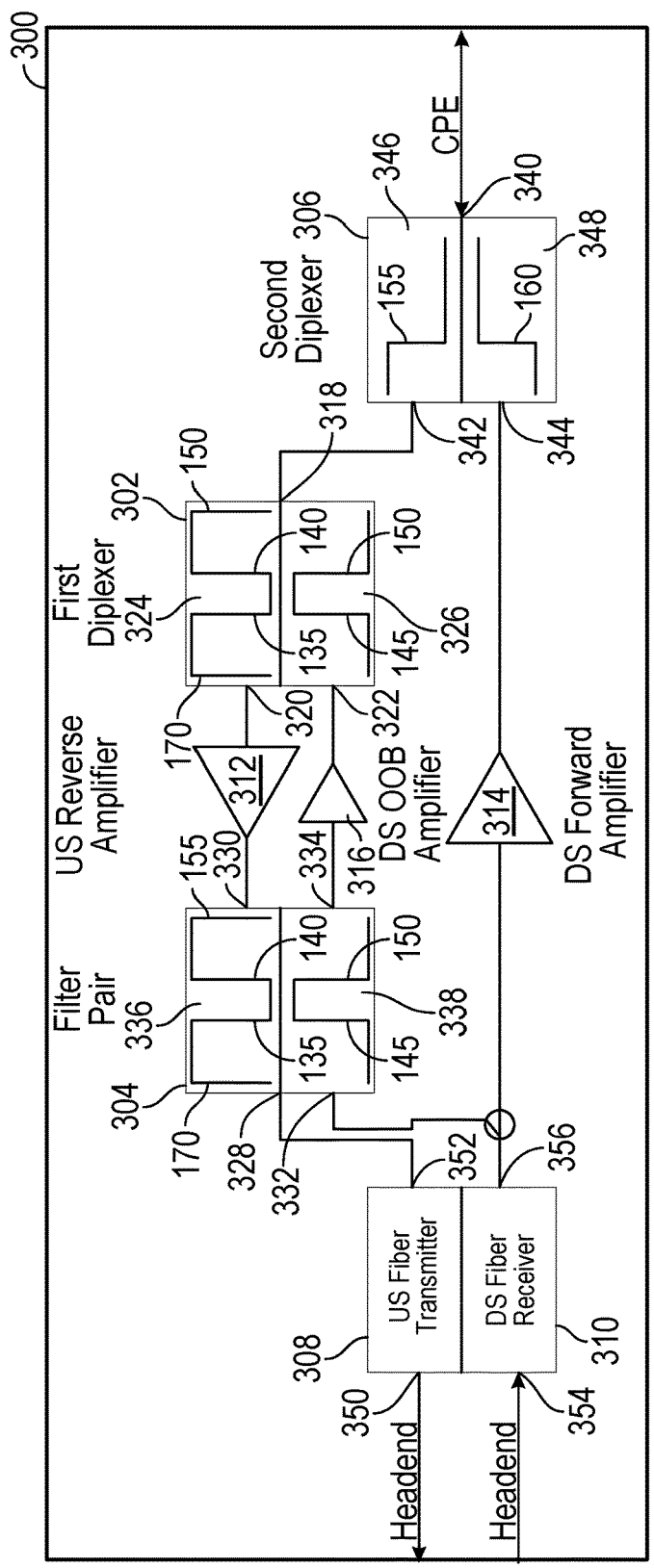
FIG. 3 is a block diagram of an apparatus comprising a node.

FIG. 3 is a block diagram of a node 300. With node 300, signals may be receives from the headend via fiber optic cable rather than via coaxial cable for example. As shown in FIG. 3, node 300 may comprise a first diplexer 302, a filter pair 304, a second diplexer 306, an upstream fiber transmitter 308, a downstream fiber receiver 310, an upstream reverse amplifier 312, a downstream forward amplifier 314, and a downstream OOB amplifier 316. First diplexer 302 may comprise a first diplexer first port 318, a first diplexer second port 320, a first diplexer third port 322, a first diplexer band-stop filter 324, and a first diplexer band-pass filter 326. Filter pair 304 may comprise a filter pair first port 328, a filter pair second port 330, a filter pair third port 332, a filter pair fourth port 334, a filter pair band-stop filter 336, and a filter pair band-pass filter 338. Second diplexer 306 may comprise a second diplexer first port 340, a second diplexer second port 342, a second diplexer third port 344, a second diplexer low-pass filter 346, and a second diplexer high-pass filter 348. Upstream fiber transmitter 308 may comprise an upstream fiber transmitter first port 350 and an upstream fiber transmitter second port 352. Downstream fiber receiver 310 may comprise a downstream fiber receiver first port 354 and a downstream fiber receiver second port 356.

Upstream fiber transmitter 308 may receive an electrical signal on upstream fiber transmitter second port 352. Upstream fiber transmitter 308 may convert the received electrical signal into a corresponding optical signal. Upstream fiber transmitter 308 may then transmit the optical signal out at upstream fiber transmitter first port 350. Downstream fiber receiver 310 may receive an optical signal on downstream fiber receiver first port 354. Downstream fiber receiver 310 may convert the received optical signal into a corresponding electrical signal. Downstream fiber receiver 310 may then transmit the electrical signal out at downstream fiber receiver second port 356.

First diplexer band-stop filter 324 may attenuate signals with frequencies between greater than and equal to first frequency 135 and less than and equal to second frequency 140. First diplexer band-stop filter 324 may be connected between first diplexer first port 318 and first diplexer second port 320. First diplexer band-pass filter 326 may passes signals with frequencies between greater than and equal to third frequency 145 and less than and equal to fourth frequency 150. First diplexer band-pass filter 326 may be connected between first diplexer first port 318 and first diplexer third port 322.

Filter pair band-stop filter 336 may attenuate signals with frequencies between greater than and equal to first frequency 135 and less than and equal to second frequency 140. Filter pair band-stop filter 336 may be connected between filter pair first port 328 and filter pair second port 330. Filter pair band-pass filter 338 may pass signals with frequencies between greater than and equal to third frequency 145 and less than and equal to fourth frequency 150. Filter pair band-pass filter 338 may be connected between filter pair third port 332 and filter pair fourth port 334.

Upstream reverse amplifier 312 may amplify signals from first diplexer second port 320 to filter pair second port 330. Upstream reverse amplifier 312 may be connected between first diplexer second port 320 and filter pair second port 330. Downstream OOB amplifier 316 may amplify signals from filter pair fourth port 334 to first diplexer third port 322. Downstream OOB amplifier 316 may be connected between filter pair fourth port 334 and first diplexer third port 322.

Second diplexer low-pass filter 346 may pass signals with frequencies equal to and lower than fifth frequency 155. Second diplexer low-pass filter 346 may be connected between second diplexer first port 340 and second diplexer second port 342. Second diplexer high-pass filter 348 may pass signals with frequencies equal to and greater than sixth frequency 160. Second diplexer high-pass filter 348 may be connected between second diplexer first port 340 and second diplexer third port 344. First diplexer first port 318 may be connected to second diplexer second port 342. Second diplexer first port 340 may be connected to CPE. The CPE may comprise similar type CPE devices as described above with respect to FIG. 2.

Downstream forward amplifier 314 may amplify signals from downstream fiber receiver second port 356 to second diplexer third port 344. Downstream forward amplifier 314 may be connected between second diplexer third port 344 and downstream fiber receiver second port 356. Downstream fiber receiver second port 356 may be connected to filter pair third port 332. Upstream fiber transmitter second port 352 may be connected to filter pair first port 328. Upstream fiber transmitter first port 350 may be connected to the headend and downstream fiber receiver first port 354 may be connected to the headend. The headend may comprise similar type headend devices as described above with respect to FIG. 2.

The headend may transmit downstream signals into downstream fiber receiver first port 354. The combination of downstream fiber receiver 310, downstream forward amplifier 314, and second diplexer high-pass filter 348 may insure that signals equal to and above sixth frequency 160 (e.g. in second downstream frequency band portion 120) may be transmitted downstream through node 300 from the headend to the CPE. The combination of downstream fiber receiver 310, filter pair band-pass filter 338, downstream OOB amplifier 316, first diplexer band-pass filter 326, and second diplexer low-pass filter 346, may insure that signals between third frequency 145 and fourth frequency 150 inclusively (e.g. in first downstream frequency band portion 115) may be transmitted downstream through amplifier 200 from the headend to the CPE.

Similarly CPE may transmit upstream signals into second diplexer first port 340. The combination of second diplexer low-pass filter 346, first diplexer band-stop filter 324, upstream reverse amplifier 312, filter pair band-stop filter 336, and upstream fiber transmitter 308 may insure that signals between eighth frequency 170 and first frequency 135 inclusively (e.g. in first upstream frequency band portion 125) and signals between second frequency 140 and fifth frequency 155 inclusively (e.g. in second upstream frequency band portion 130) may be transmitted upstream through amplifier 200 from the CPE to the headend.

Figure 4:
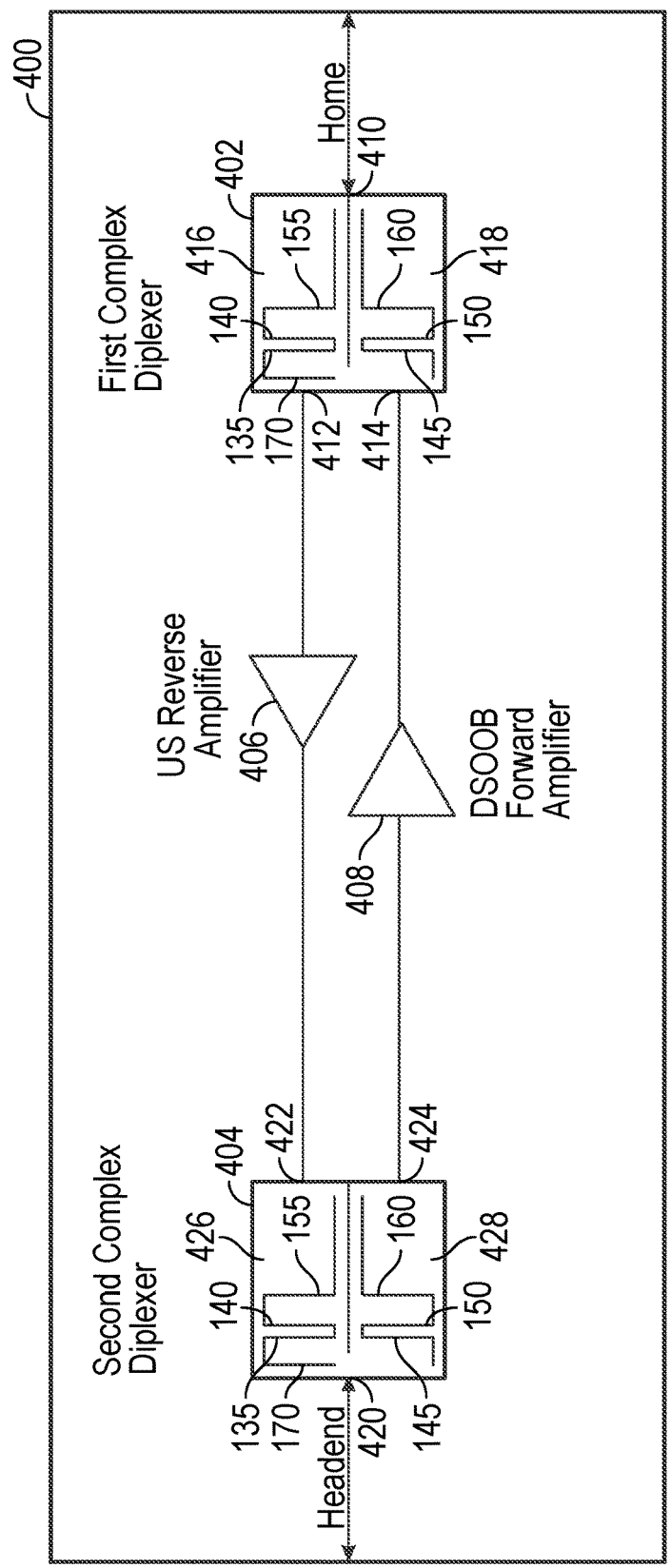
FIG. 4 is a block diagram of an apparatus comprising an amplifier.

FIG. 4 is a block diagram of an amplifier 400. As shown in FIG. 4, amplifier 400 may comprise a first complex diplexer 402, a second complex diplexer 404, an upstream reverse amplifier 406, and a downstream and OOB forward amplifier 408. First complex diplexer 402 may comprise a first complex diplexer first port 410, a first complex diplexer second port 412, a first complex diplexer third port 414, a first complex diplexer low-pass band-stop filter 416, and a first complex diplexer high-pass band-pass filter 418. Second complex diplexer 404 may comprise a second complex diplexer first port 420, a second complex diplexer second port 422, a second complex diplexer third port 424, a second complex diplexer low-pass band-stop filter 426, and a second complex diplexer high-pass band-pass filter 428.

First complex diplexer low-pass band-stop filter 416 may be connected between first complex diplexer first port 410 and first complex diplexer second port 412. First complex diplexer low-pass band-stop filter 416 may pass signals with frequencies equal to and lower than fifth frequency 155 while attenuating signals with frequencies between greater than and equal to first frequency 135 and less than and equal to second frequency 140.

First complex diplexer high-pass band-pass filter 418 may be connected between first complex diplexer first port 410 and first complex diplexer third port 414. First complex diplexer high-pass band-pass filter 418 may pass signals with frequencies between greater than and equal to third frequency 145 and less than and equal to fourth frequency 150. Also, first complex diplexer high-pass band-pass filter 418 may pass signals with frequencies equal to and greater than sixth frequency 160.

Second complex diplexer low-pass band-stop filter 426 may be connected between second complex diplexer first port 420 and second complex diplexer second port 422. Second complex diplexer low-pass band-stop filter 426 may pass signals with frequencies equal to and lower than fifth frequency 155 while attenuating signals with frequencies between greater than and equal to first frequency 135 and less than and equal to second frequency 140.

Second complex diplexer high-pass band-pass filter 428 may be connected between second complex diplexer first port 420 and second complex diplexer third port 424. Second complex diplexer high-pass band-pass filter 428 may pass signals with frequencies between greater than and equal to third frequency 145 and less than and equal to fourth frequency 150. In addition, second complex diplexer high-pass band-pass filter 428 may pass signals with frequencies equal to and greater than sixth frequency 160.

Upstream reverse amplifier 406 may amplify signals from first complex diplexer second port 412 to second complex diplexer second port 422. Upstream reverse amplifier 406 may be connected between first complex diplexer second port 412 and second complex diplexer second port 422. Downstream and DSOOB forward amplifier 408 may amplify signals from second complex diplexer third port 424 to first complex diplexer third port 414. Downstream and DSOOB forward amplifier 408 may be connected between second complex diplexer third port 424 and first complex diplexer third port 414. The CPE may comprise similar type CPE devices as described above with respect to FIG. 2. The headend may comprise similar type headend devices as described above with respect to FIG. 2.

The headend may transmit downstream signals into second complex diplexer first port 420. The combination of second complex diplexer high-pass band-pass filter 428, downstream and OOB forward amplifier 408, and first complex diplexer high-pass band-pass filter 418 may insure that: i) signals equal to and above sixth frequency 160 (e.g. in second downstream frequency band portion 120); and ii) signals between third frequency 145 and fourth frequency 150 inclusively (e.g. in first downstream frequency band portion 115) may be transmitted downstream through amplifier 400 from the headend to the CPE.

Similarly CPE may transmit upstream signals into first complex diplexer first port 410. The combination of first complex diplexer low-pass band-stop filter 416, upstream reverse amplifier 406, and second complex diplexer low-pass band-stop filter 426 may insure that: i) signals between eighth frequency 170 and first frequency 135 inclusively (e.g. in first upstream frequency band portion 125); and ii) signals between second frequency 140 and fifth frequency 155 inclusively (e.g. in second upstream frequency band portion 130) may be transmitted upstream through amplifier 400 from the CPE to the headend.

Figure 5:
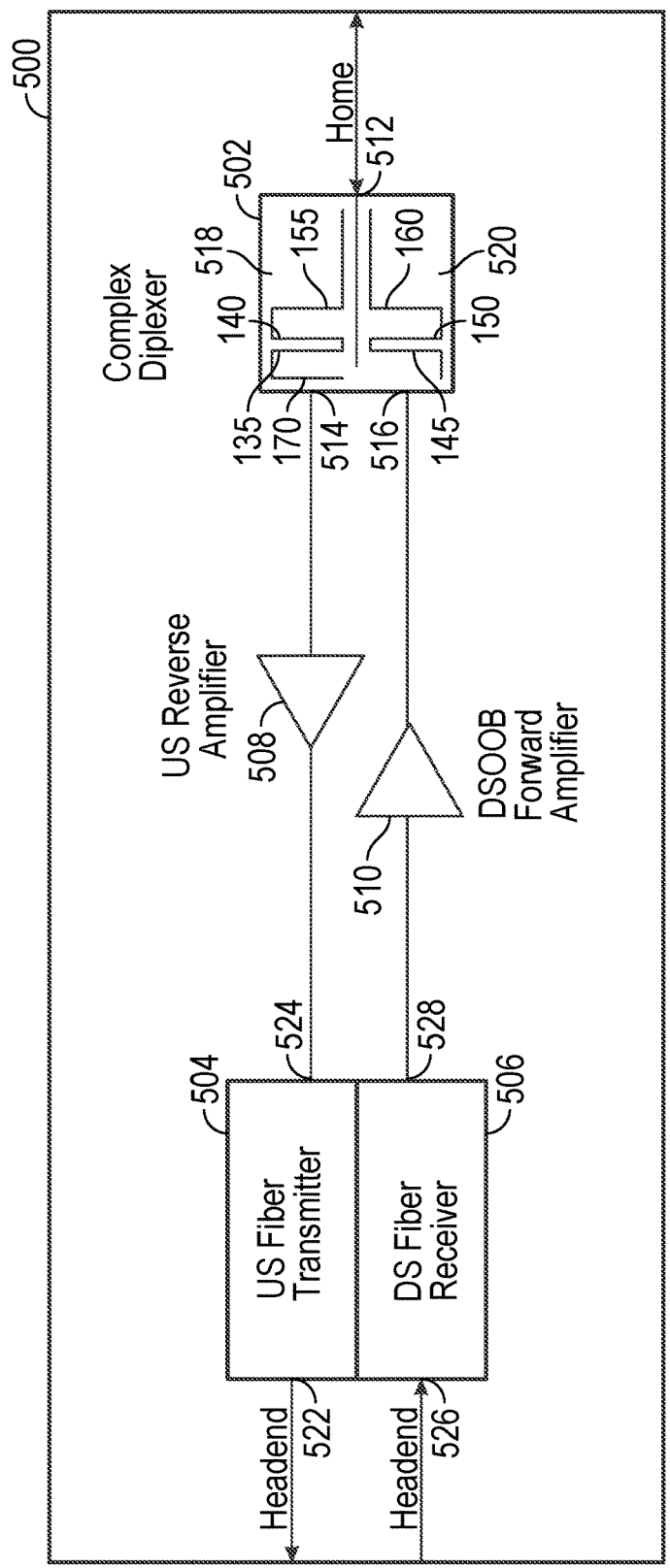
FIG. 5 is a block diagram of an apparatus comprising a node.

FIG. 5 is a block diagram of a node 500. With node 500, signals may be receives from the headend via fiber optic cable rather than via coaxial cable for example. As shown in FIG. 5, node 500 may comprise a complex diplexer 502, an upstream fiber transmitter 504, a downstream fiber receiver 506, an upstream reverse amplifier 508, and a downstream and OOB forward amplifier 510. Complex diplexer 502 may comprise a complex diplexer first port 512, a complex diplexer second port 514, a complex diplexer third port 516, complex diplexer low-pass band-stop filter 518, and a complex diplexer high-pass band-pass filter 520. Upstream fiber transmitter 504 may comprise an upstream fiber transmitter first port 522 and an upstream fiber transmitter second port 524. Downstream fiber receiver 506 may comprise a downstream fiber receiver first port 526 and a downstream fiber receiver second port 528.

Complex diplexer low-pass band-stop filter 518 may be connected between complex diplexer first port 512 and complex diplexer second port 514. Complex diplexer low-pass band-stop filter 518 may pass signals with frequencies equal to and lower than fifth frequency 155 while attenuating signals with frequencies between greater than and equal to first frequency 135 and less than and equal to second frequency 140.

Complex diplexer high-pass band-pass filter 520 may be connected between complex diplexer first port 512 and complex diplexer third port 516. Complex diplexer high-pass band-pass filter 520 may pass signals with frequencies between greater than and equal to third frequency 145 and less than and equal to fourth frequency 150. Also, complex diplexer high-pass band-pass filter 520 may pass signals with frequencies equal to and greater than sixth frequency 160.

Upstream fiber transmitter 504 may receive an electrical signal on upstream fiber transmitter second port 524. Upstream fiber transmitter 504 may convert the received electrical signal into a corresponding optical signal. Upstream fiber transmitter 504 may then transmit the optical signal out at upstream fiber transmitter first port 522. Downstream fiber receiver 506 may receive an optical signal on downstream fiber receiver first port 526. Downstream fiber receiver 506 may convert the received optical signal into a corresponding electrical signal. Downstream fiber receiver 506 may then transmit the electrical signal out at downstream fiber receiver second port 528.

Upstream reverse amplifier 508 may amplify signals from complex diplexer second port 514 to upstream fiber transmitter second port 524. Upstream reverse amplifier 508 may be connected between complex diplexer second port 514 and upstream fiber transmitter second port 524. Downstream and DSOOB forward amplifier 510 may amplify signals from downstream fiber receiver second port 528 to complex diplexer third port 516. Downstream and DSOOB forward amplifier 510 may be connected between downstream fiber receiver second port 528 and complex diplexer third port 516. The CPE may comprise similar type CPE devices as described above with respect to FIG. 2. The headend may comprise similar type headend devices as described above with respect to FIG. 2.

The headend may transmit downstream signals into downstream fiber receiver first port 526. The combination of downstream and OOB forward amplifier 510 and complex diplexer high-pass band-pass filter 520 may insure that: i) signals equal to and above sixth frequency 160 (e.g. in second downstream frequency band portion 120); and ii) signals between third frequency 145 and fourth frequency 150 inclusively (e.g. in first downstream frequency band portion 115) may be transmitted downstream through node 500 from the headend to the CPE.

Similarly CPE may transmit upstream signals into complex diplexer first port 512. The combination of complex diplexer low-pass band-stop filter 518 and upstream reverse amplifier 508 may insure that: i) signals between eighth frequency 170 and first frequency 135 inclusively (e.g. in first upstream frequency band portion 125); and ii) signals between second frequency 140 and fifth frequency 155 inclusively (e.g. in second upstream frequency band portion 130) may be transmitted upstream through amplifier 500 from the CPE to the headend.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure (including, but not limited to transmitter, filters, amplifiers, and diplexers for example) may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems. With computer/software embodiments, the frequency bands may be "generated" by turning band segments on and off using, for example, a field-programmable gate array (FPGA) driving digital to analog converters (DACs)

instead of filters. Some or all of the filtering may be implemented in the FPGA signal generators.

Embodiments of the disclosure may be practiced via a system-on-a-chip (SOC) where each or many of the components illustrated in FIG. 2, FIG. 3, FIG. 4, and FIG. 5 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of a computing device on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a first diplexer having a first diplexer first port, a first diplexer second port, and a first diplexer third port, the first diplexer comprising:
      a first diplexer band-stop filter that attenuates signals with frequencies between greater than and equal to a first frequency and less than and equal to a second frequency, the first diplexer band-stop filter being connected between the first diplexer first port and the first diplexer second port, and
      a first diplexer band-pass filter that passes signals with frequencies between greater than and equal to a third frequency and less than and equal to a fourth frequency, the first diplexer band-pass filter being connected between the first diplexer first port and the first diplexer third port;
   a filter pair having a filter pair first port, a filter pair second port, a filter pair third port, and a filter pair fourth port, the filter pair comprising:
      a filter pair band-stop filter that attenuates signals with frequencies between greater than and equal to the first frequency and less than and equal to the second frequency, the filter pair band-stop filter being connected between the filter pair first port and the filter pair second port, and
      a filter pair band-pass filter that passes signals with frequencies between greater than and equal to the third frequency and less than and equal to the fourth frequency, the filter pair band-pass filter being connected between the filter pair third port and the filter pair fourth port;
   an upstream reverse amplifier that amplifies signals from the first diplexer second port to the filter pair second port, the upstream reverse amplifier connected between the first diplexer second port and the filter pair second port; and
   a downstream Out-of-Band (OOB) amplifier that amplifies signals from the filter pair fourth port to the first diplexer third port, the downstream Out-of-Band (OOB) amplifier connected between the filter pair fourth port and the first diplexer third port.

2. The apparatus of claim 1, further comprising a second diplexer having a second diplexer first port, a second diplexer second port, and a second diplexer third port, the second diplexer comprising:
   a second diplexer low-pass filter that passes signals with frequencies equal to and lower than a fifth frequency, the second diplexer low-pass filter being connected between the second diplexer first port and the second diplexer second port; and
   a second diplexer high-pass filter that passes signals with frequencies equal to and greater than a sixth frequency, the second diplexer high-pass filter being connected between the second diplexer first port and the second diplexer third port.

3. The apparatus of claim 2, wherein the first diplexer first port is connected to the second diplexer second port.

4. The apparatus of claim 2, wherein the second diplexer first port is connected to customer equipment.

5. The apparatus of claim 2, further comprising:
   a downstream fiber receiver having a downstream fiber receiver first port and a downstream fiber receiver second port, the downstream fiber receiver second port being connected to the filter pair third port; and
   a downstream forward amplifier that amplifies signals from the downstream fiber receiver second port to the second diplexer third port, the downstream forward amplifier being connected between the second diplexer third port and the downstream fiber receiver second port.

6. The apparatus of claim 1, further comprising an upstream fiber transmitter having an upstream fiber transmitter first port and an upstream fiber transmitter second port, the upstream fiber transmitter second port being connected to the filter pair first port.

7. The apparatus of claim 6, wherein the upstream fiber transmitter first port is connected to a headend.

8. The apparatus of claim 1, further comprising a downstream fiber receiver having a downstream fiber receiver first port and a downstream fiber receiver second port, the downstream fiber receiver second port being connected to the filter pair third port.

9. The apparatus of claim 8, wherein the downstream fiber receiver first port is connected to a headend.

10. The apparatus of claim 1, further comprising a third diplexer having a third diplexer first port, a third diplexer second port, and a third diplexer third port, the third diplexer comprising:
    a third diplexer low-pass filter that passes signals with frequencies equal to and lower than a fifth frequency, the third diplexer low-pass filter being connected between the third diplexer first port and the third diplexer second port; and
    a third diplexer high-pass filter that passes signals with frequencies equal to and greater than a sixth frequency, the third diplexer high-pass filter being connected between the third diplexer first port and the third diplexer third port.

11. The apparatus of claim 10, wherein the first diplexer first port is connected to the third diplexer second port.

12. The apparatus of claim 10, wherein the third diplexer first port is connected to customer equipment.

13. The apparatus of claim 10, further comprising a fourth diplexer having a fourth diplexer first port, a fourth diplexer second port, and a fourth diplexer third port, the fourth diplexer comprising:
 a fourth diplexer low-pass filter that passes signals with frequencies equal to and lower than the fifth frequency, the fourth diplexer low-pass filter being connected between the fourth diplexer first port and the fourth diplexer second port; and
 a fourth diplexer high-pass filter that passes signals with frequencies equal to and greater than the sixth frequency, the fourth diplexer high-pass filter being connected between the fourth diplexer first port and the fourth diplexer third port.

14. The apparatus of claim 13, wherein the second diplexer first port is connected to the fourth diplexer second port.

15. The apparatus of claim 13, wherein the fourth diplexer first port is connected to a headend.

16. The apparatus of claim 13, further comprising a downstream forward amplifier that amplifies signals from the fourth diplexer third port to the third diplexer third port, the downstream forward amplifier being connected between the fourth diplexer third port and the third diplexer third port.

17. The apparatus of claim 10, wherein:
 the first frequency is less than the third frequency, the fourth frequency, the second frequency, the fifth frequency, and the sixth frequency;
 the third frequency is greater than the first frequency, but less than the fourth frequency, the second frequency, the fifth frequency, and the sixth frequency;
 the fourth frequency is greater than the first frequency and the third frequency, but less than the second frequency, the fifth frequency, and the sixth frequency;
 the second frequency is greater than the first frequency, the third frequency, and the fourth frequency, but less than the fifth frequency and the sixth frequency;
 the fifth frequency is greater than the first frequency, the third frequency, the fourth frequency, and the second frequency, but less than the sixth frequency; and
 the sixth frequency is greater than the first frequency, the third frequency, the fourth frequency, the second frequency, and the fifth frequency.

18. The apparatus of claim 10, wherein:
 the first frequency is 60 MHz;
 the second frequency is 140 MHz;
 the third frequency is 70 MHz;
 the fourth frequency is 130 MHz;
 the fifth frequency is 204 MHz; and
 the sixth frequency is 258 MHz.

19. The apparatus of claim 10, wherein:
 the first frequency is 64 MHz;
 the second frequency is 84 MHz;
 the third frequency is 72 MHz;
 the fourth frequency is 76 MHz;
 the fifth frequency is 204 MHz; and
 the sixth frequency is 258 MHz.

\* \* \* \* \*